US 6,640,780 B2

(12) United States Patent
Blair

(10) Patent No.: US 6,640,780 B2
(45) Date of Patent: Nov. 4, 2003

(54) SIDE VALVE ARRANGEMENT FOR AN INTERNAL COMBUSTION ENGINE

(75) Inventor: Gordon Blair, Belfast (GB)

(73) Assignee: XRDi, Inc., Beaufort, SC (US)

( * ) Notice: Subject to any disclaimer, the term of this patent is extended or adjusted under 35 U.S.C. 154(b) by 0 days.

(21) Appl. No.: 09/949,896

(22) Filed: Sep. 12, 2001

(65) Prior Publication Data

US 2002/0056439 A1 May 16, 2002

Related U.S. Application Data

(60) Provisional application No. 60/248,204, filed on Nov. 15, 2000.

(51) Int. Cl.[7] .............................................. F02B 15/00
(52) U.S. Cl. ...................................................... 123/432
(58) Field of Search ................................ 123/658, 432, 123/285, 265

(56) References Cited

U.S. PATENT DOCUMENTS

| 1,070,139 A | 8/1913 | Kessler |
| 1,113,743 A | 10/1914 | Besserdich |
| 1,269,264 A | 6/1918 | D'Orville |
| 1,415,374 A | 5/1922 | Lovejoy |
| 1,495,291 A | 5/1924 | Fekete et al. |
| 1,521,440 A | 12/1924 | Foster |
| 1,687,082 A | 10/1928 | Cole |
| 1,824,992 A * | 9/1931 | Harroun .................. 123/51 A |
| 1,825,817 A | 10/1931 | Patterson |
| 1,904,775 A | 4/1933 | Bartholomew |
| 1,970,025 A | 8/1934 | Teeter |
| 2,003,677 A * | 6/1935 | Church ..................... 123/658 |
| 2,083,939 A * | 6/1937 | Brush ....................... 123/658 |
| RE20,670 E * | 3/1938 | Bocz ......................... 123/658 |
| 2,244,214 A | 6/1941 | Pescara |
| 2,686,513 A * | 8/1954 | Nallinger .................. 123/263 |
| 2,701,556 A | 2/1955 | Woerner |
| 5,452,702 A | 9/1995 | Ebihara et al. |

* cited by examiner

Primary Examiner—Mahmoud Gimie
(74) Attorney, Agent, or Firm—Crowell & Moring LLP

(57) ABSTRACT

A side valve internal combustion engine provided with at least one combustion cylinder having a piston. At least two intake valves and at least one exhaust valve are provided for each of the combustion cylinders. In order to maintain a compact engine and provide a nozzle-type combustion chamber, the intake valves and exhaust valve are locate to one side of the combustion chamber in the engine block. The exhaust valve is further located at a greater distance from the combustion cylinder than the intake valves in order to decrease heat distribution on the cylinder walls. The nozzle-type chamber provides for efficient flow of gases within the engine.

41 Claims, 6 Drawing Sheets

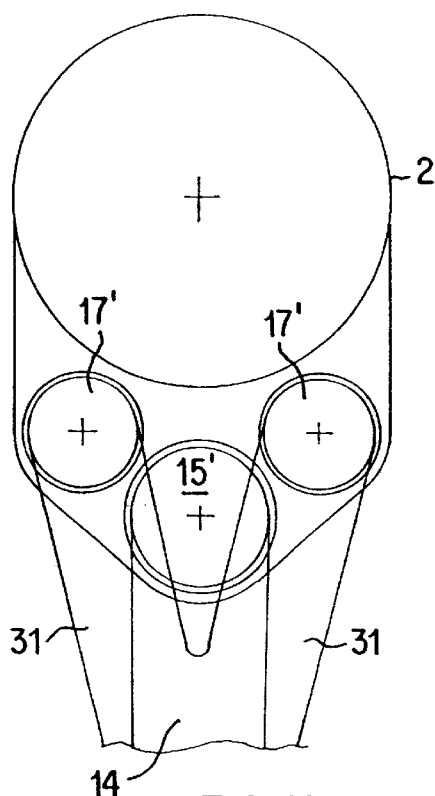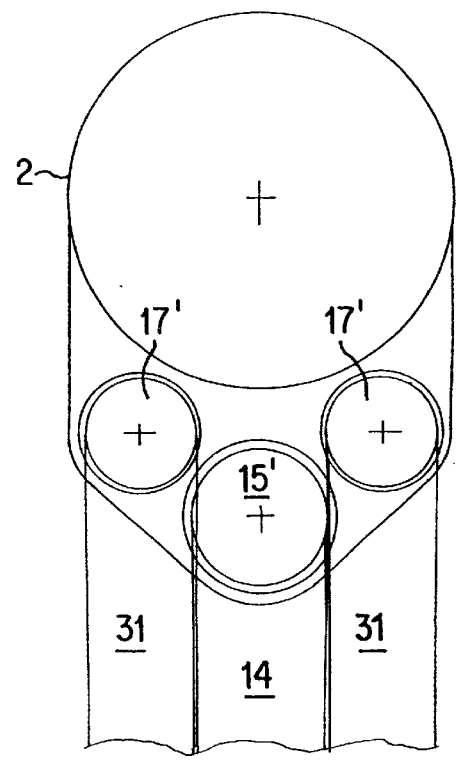
FIG. 12        FIG. 14
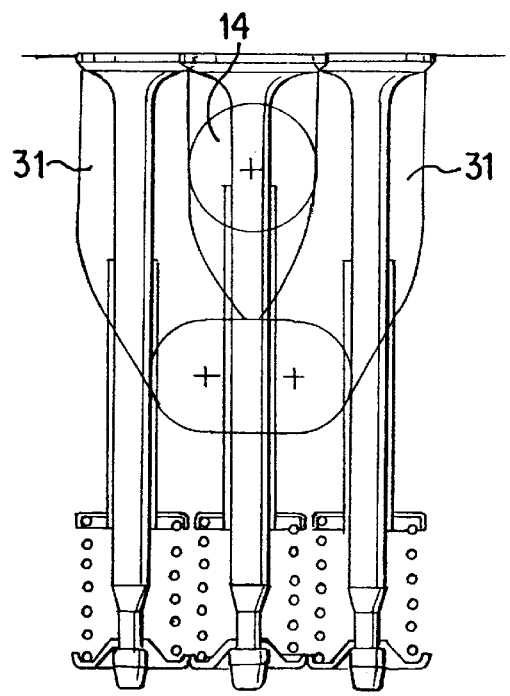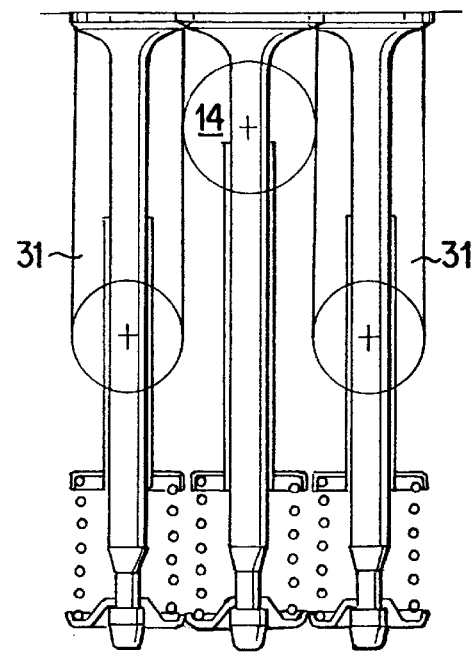
FIG. 11        FIG. 13

SIDE VALVE ARRANGEMENT FOR AN INTERNAL COMBUSTION ENGINE

This application claims the priority of U.S. Provisional Application No. 60/248,204, filed in the United States of America on Nov. 15, 2000, the disclosure of which is expressly incorporated by reference herein.

BACKGROUND AND SUMMARY OF THE INVENTION

The invention relates to internal combustion engines with so-called side valve type, L-head type or flathead cylinder head layouts. In particular, the invention relates to an internal combustion engine with a side valve type cylinder head having two intake valves and an exhaust valve arranged as side valves.

In U.S. Pat. No. 1,687,082, a T-head type side valve arrangement is shown. Three valves are shown arranged across the cylinder from each other at both sides of the combustion chamber. Two intake valves are shown at these different sides. However, only one of the intake valves supplies an air/fuel mixture, while the other intake valve supplies air only. The layout for the valves precludes a compact combustion chamber and increases flow inefficiencies.

In U.S. Pat. No. 1,521,440, a valve arrangement is shown wherein an intake valve and an exhaust valve are located across from each other at a 45-degree angle to the cylinder. This type of arrangement requires two camshafts for the valve operations. This arrangement also precludes a compact combustion chamber and engine design.

In U.S. Pat. No. 2,179,143, an early overhead valve arrangement is shown. With this arrangement the cylinder head increases in weight and volume precluding a light engine and compact design.

In U.S. Pat. No. 2,244,214, an F-head engine arrangement is shown. This arrangement provides for an overhead exhaust valve and two side inlet valves. This arrangement requires significant overhead space for the operation of the overhead valve. The cylinder head is precluded from being compact by such a design.

Traditionally, side valve engines are characterized by low power output attributed to a two valve layout with valves that are masked over nearly 180° C. of their circumference and with a low cylinder head height which prevents the valves, particularly the intake valve, lifting to a conventional level of some 33% of its inner seat diameter. The cylinder head has a high surface-volume ratio of its combustion chamber exacerbating the heat loss from the combustion chamber during the combustion period, reducing power output and raising hydrocarbon emissions. Additionally, to reduce the chamber volume in the two-valve layout, the mouth into the side valve chest is reduced in area giving an excessive squish effect, which increases the pumping losses into, and out of, the chamber, hence further lowering the attained engine torque.

The plan view of a typical side valve combustion chamber resembles a "bone" with the two valves at either end. This layout is hardly ideal from a combustion standpoint, making it prone to detonation at equal compression ratios with an overhead valve engine. The squish flow into the "bone" shape is a diffusing flow, i.e. it slows down as it travels. As the exhaust valve is the farthest point away from the combustion chamber, this leaves hot exhaust gas unscavenged by a fresh squish charge, and so, tends to cause "knocking" of the compressed charge. The "bone" shape also makes the optimum placement of a spark plug more problematic.

The close proximity of the hot exhaust valve to the cylinder bore also gives rise to bore distortion which increases the oil consumption rate of the engine and further raises the exhaust emissions of unburned hydrocarbons. This heat distortion reduces the life of the engine and eventually gives rise to a decrease in performance and to significant wear on the engine components. Known methods of overcoming the heat distortion are to locate the exhaust valve farther away from the combustion chamber thus exacerbating the inefficiencies of the cylinder head design, i.e. the exhaust valve is then smaller, or the cylinder head surface area increases. A spark plug located near the exhaust valve may also experience increased temperature effects due to the flow into the exhaust valve and reduce its life and its effectiveness.

Certain preferred embodiments of the invention have as a basis a problem of solving the inherent inefficiencies and above-stated problems related to a conventional two-valve side valve cylinder head arrangement and the prior art.

An object of the invention is to increase the performance and life of a side valve type engine while maintaining the beneficial characteristics of a side valve design, which side valve design is much smaller, lighter and more compact than an overhead valve or overhead cam design and very much cheaper and simpler to manufacture.

Another object according to certain preferred embodiments of the invention is to reduce or eliminate the heat distortion on the piston cylinder walls due to the close proximity of the exhaust port.

Another object according to certain preferred embodiments of the invention is to increase the volumetric efficiencies for a side valve type engine and reduce inherent throat restrictions of the valve circumference or the cylinder head, i.e. the "masking" of the valves.

Another object according to certain preferred embodiments of the invention is to provide a cylinder head and combustion chamber design that lends itself to a simple, effective placement of an ignition plug.

These problems are solved according to certain preferred embodiments of the invention by an at least three-valve side valve arrangement. A side-valve engine comprises at least one cylinder having a movable piston and at least two intake valves being located to one side of each of the at least one cylinder. Further advantages are provided by at least one exhaust valve being located to the one side of said each of the at least one cylinder. This arrangement allows for a compact combustion chamber and compact engine design.

In certain preferred embodiments, the intake valves are located between the piston cylinder and the exhaust valve. Preferably, the exhaust valve is located farther from the cylinder than the intake valves. The intake valves are arranged on respective sides of a radial line of the cylinder to the exhaust valve, and the intake valves are symmetrically arranged on the one side of the cylinder between the exhaust valve and the cylinder.

Preferably, the intake valves are positioned in the engine block to one side of the piston cylinder with the valves seating into the engine block substantially parallel to a radius of the piston cylinder. Valves stems operating substantially parallel to an axial extent of the piston cylinder allows for a more compact design of the engine.

A further advantage of certain preferred embodiments provides at least one exhaust valve being positioned radially farther away from the piston cylinder than the intake valves. Preferably, the exhaust valve is substantially centered on a radial centerline of the piston cylinder, and the intake valves are substantially symmetrical about the piston cylinder radial centerline. Such arrangement eliminates heat distortion to the piston cylinder walls by the exhaust valve and port due to the location of the exhaust valve and port away from these walls. The intake valves, and the metal bridge between these ports, also have some cooling effect to the exhaust valve and port.

In other contemplated embodiments, the cylinder head design allows for the exhaust valve being off the radial centerline of the piston cylinder and the intake valves being arranged non-symmetrically about the radial centerline and each other.

A three-valve arrangement according to certain preferred embodiments of the invention also provides a more regular shape and reduces or eliminates the cylinder head pumping restrictions inherent in a two-valve design. The design nearly eliminates throat or masking restrictions for the intake valves and considerably decreases the throat or masking restrictions for the exhaust valve. Both the intake and exhaust valves can be lifted to values conventional for an overhead valve or an overhead cam engine and, being possessed of similar discharge coefficients of flow, can breathe air and produce power equal to an equivalent overhead valve engine. The valve areas which are shrouded for the three-valve design are hence decreased and contribute to high volumetric efficiencies. The design also is beneficial to the combustion chamber shape. The combustion chamber shape provided is much more symmetrical and regular. The "bone" shape with its diffusing squish flow is eliminated. It is important to note that the diffuser shape is eliminated and replaced by a nozzle profile which permits a high recirculation velocity over the exhaust valve so that the "knock promoting" pockets of residual exhaust gas are removed. The regular shape of the chamber above the valves also lends itself to an effective location of a spark plug. The spark plug may be located about the radial centerline of the combustion cylinder and midway between the intake valves. The igniter/spark plug may also be arranged near the sidewall of the piston cylinder. The location of the intake valve flow also has a cooling effect on the spark plug and leaves fresh charge to promote good ignition.

The effective tumbling squishing characteristics allow a more efficient engine which can use higher compression ratios without incurring detonation. Bore distortion is severely decreased due to the placement of the exhaust valve and port away from the piston cylinder. The placement of the intake valves also allows a better shape for the intake runners or pipes leading to the valves, which shape yields high discharge coefficients for intake inflow of air. The design allows for the beneficial use of side valve cylinders and its accompanying small sized engine while considerably improving the overall efficiency over conventional side valve engines. The benefits of the design are higher compression ratios, longer life, improvements in power, torque, fuel consumption and emissions. The performance characteristics of such engine designs can match an equivalent two-valve overhead valve engine.

Other objects, advantages and novel features of the present invention will become apparent from the following detailed description of the invention when considered in conjunction with the accompanying drawings.

BRIEF DESCRIPTION OF THE DRAWINGS

FIG. 11 shows a port layout for "Siamese" intake ports in side view;

FIG. 12 shows a port layout for "Siamese" intake ports in plan view;

FIG. 13 shows a port and valve layout for individual intake ports in side view; and FIG. 14 shows a port and valve layout for individual intake ports in plan view.

DETAILED DESCRIPTION OF THE DRAWINGS

Figure 2:
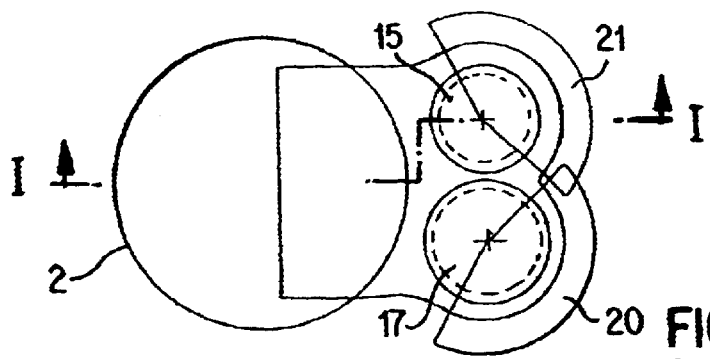
FIG. 2 shows a prior art engine of FIG. 1 in plan view.
Figure 1:
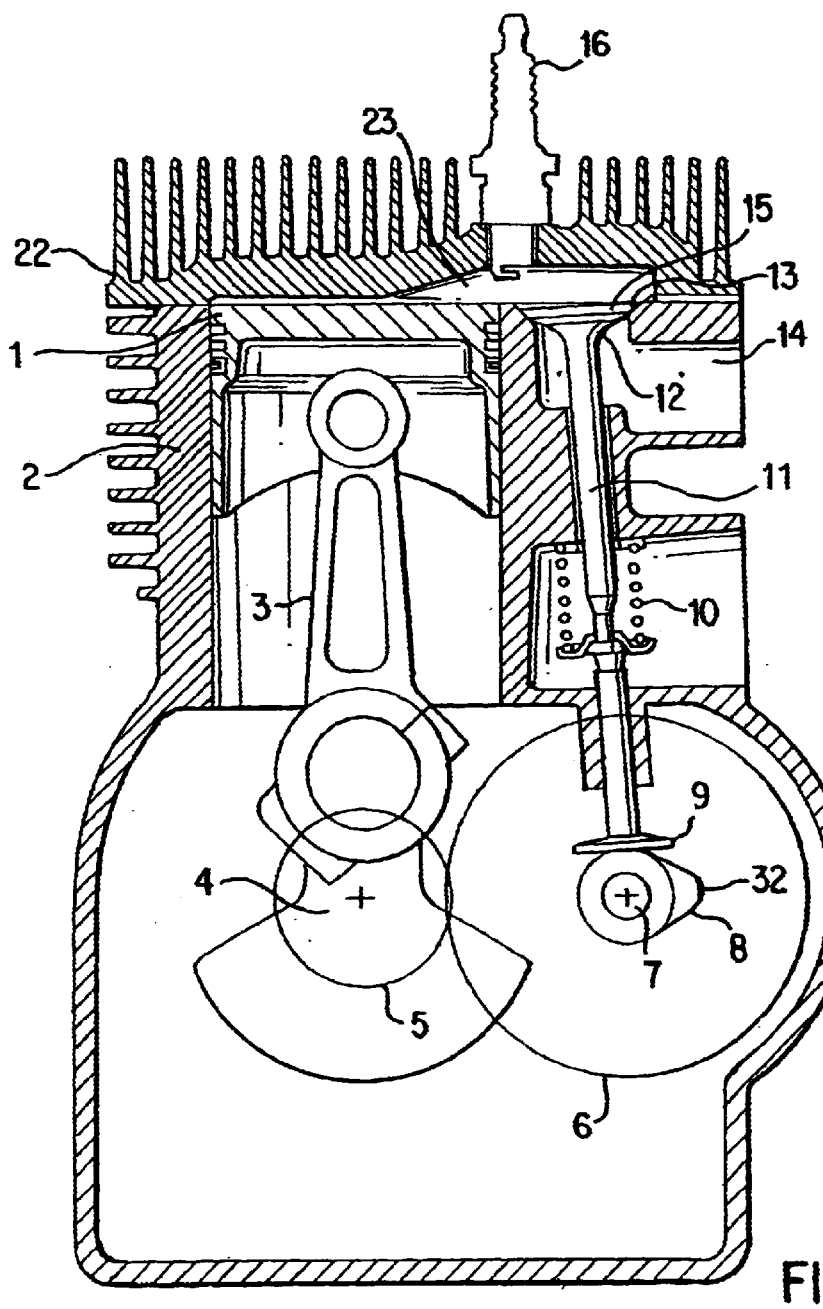
FIG. 1 shows a prior art two-valve side valve engine in section.

FIGS. 1 and 2 show a traditional two-valve layout for a side valve type engine. Similar reference numerals are used to show similar features throughout the figures. FIG. 1 shows a sectional view of an engine with a piston 1 reciprocally movable within the cylinder 2 connected to the crankshaft 4 by a rod 3. An intake port 31 provided in the vicinity of the cylinder 2 communicates with a carburetor or other intake device. A cylinder head 22, mounted on and covering the top of the cylinder 2, is shaped to provide a combustion chamber 23 opposed to the piston 1. An intake valve 17 and an exhaust valve 15, provided on one side portion of the cylinder 2, are arranged side by side and are openable by a cam 8 on a camshaft 7. The intake and exhaust valves 15, 17 each have a valve stem 11 slanting away from the axis of the cylinder towards the camshaft 7. The stem 11 has a valve stem head 12 provided with a tapered valve disk 13 having a tapered edge defined by its slanting peripheral bottom surface. The disk 13 seats into a tapered valve seat formed at the opening of the exhaust port 14 which is adapted for communication with the combustion chamber 23, to open and close the port 14. Both valves have valve biases 10 that urge the valve closed. The valves are opened when the lifter lobe 32 of the cam 8 on the camshaft 7 pushes the valve lifter 9 upwards. The camshaft 7 has a gear 6 to engage with a gear 5 on the crankshaft 4. The contour of the combustion chamber 23 surrounds the intake valve 17 and the exhaust valve 15 and resembles that of a bone. The apex or chest height of the combustion chamber overlaps about ⅓ of the inside diameter of the cylinder 2. An igniter 16 can be screwed into the cylinder head 22 in the usual manner, with its spark gap portion exposed to the interior of the combustion chamber 23.

The engine operates in the following manner. During the intake stroke of the piston 1, an air-fuel mixture or other working gas is withdrawn from the intake valve 17 in its open position through the clearance between the disk of the intake valve 17 and the seat into the combustion chamber 23.

The air/fuel mixture or working gas flows from the intake valve and into the combustion chamber. At least a portion of the air/fuel mixture or working gas then flows through the throat restriction and into the cylinder when the piston is on an intake stroke. The intake valve is closed upon inducting a sufficient amount of the air/fuel mixture or working gas. Combustion is induced by the igniter or spark plug upon compression of the air/fuel mixture or working gas. The working gas may be air or another mixture in the case of fuel injection which supplies suitable fuel during engine operation before ignition.

After or near the end of a power stroke, the exhaust valve is opened to convey the exhaust gases from the engine. The exhaust gases after combustion are within the cylinder and combustion chamber. The exhaust stroke flows the exhaust gases or a portion of the exhaust gases past the throat restriction and to the open exhaust valve. These exhaust gases pass over the cylinder wall between the cylinder bore and the exhaust valve and into the exhaust port past the exhaust valve. Again, the flow of the exhaust gases is restricted or shrouded by the geometry around the exhaust valve.

The igniter 16 may be positioned on the radial centerline 25 of the piston cylinder 2 and midway between the valves 15, 17 and piston 1. As with the traditional two valve designs, the total exhaust valve 17 area is somewhat smaller in area than the total inlet valve 15 area. The "bone" or diffusing shape of the cylinder head 22 is seen in FIG. 2. The shrouded portion of the intake and exhaust valves 15, 17 is seen with reference to the shrouded angle encountered by each valve. The throat restrictions for the cylinder head 22 are seen in the "bone" shape. The valves encounter pumping losses during aspiration and expiration due to these throat restrictions. Pumping across a restricted length or area gives rise to volumetric inefficiencies. The shroud area of the valves shown at nearly 180° C. or half the circumference of the valves is inherent in typical two valve side valve type engines.

Figure 4:
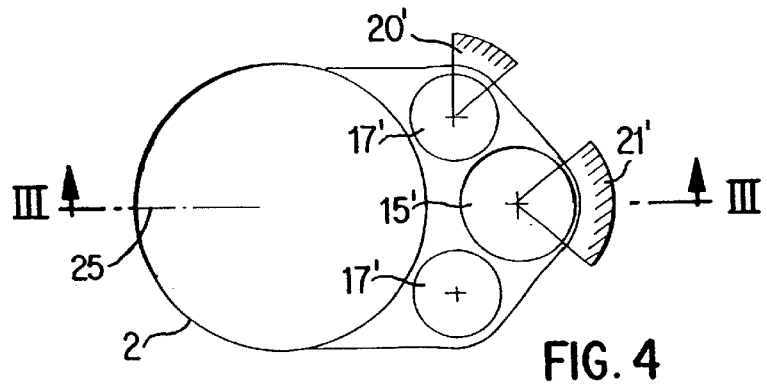
FIG. 4 shows a plan view of the three valves in relation to the cylinder.

FIG. 4 shows an overhead view of a certain preferred embodiment of the three-valve side valve arrangement. The exhaust valve 15' is located away from the piston cylinder 2 and on a radial centerline 25 of the cylinder 2. The radial centerline 25 is a radial line from the center of the cylinder 2. As in FIG. 4, the radial centerline 25 may intersect the center of the exhaust valve 15'. The intake valves 17' are located on both sides of the radial centerline 25 and radially inward from the exhaust valve 15'. This puts the inlet or intake valves 17' closer to the cylinder 2 and cylinder walls than the exhaust valve 15'. The intake valves 17' may also be positioned at different locations around the cylinder 2 other than symmetrically about the radial centerline 25 of the cylinder 2 between the cylinder 2 and the exhaust valve 15'. The cylinder head 22 is symmetric about said centerline 25. The intake valves 17' are smaller than the one exhaust valve 15' as can be seen in FIG. 4. The smaller intake valves 17' allow for a compact design of the cylinder head 22 while still providing a larger total intake area than the exhaust area. The shrouded areas are shown for the intake valves 17' and the exhaust valve 15'.

The choice of the cylinder bore diameter, the stroke, the edge clearances of the valves, together with relative sizes of the intake and exhaust valves, expressed as a valve flow area ratio, the compression ratio and the squish clearance may be used to design the exact layout of the valves and the height of the valve chest for proper clearance volume.

The squished flow into the combustion chamber is of a nozzle type, i.e. it decreases in area as it travels to the exhaust valve and hence is forced to turn to scavenge exhaust gas from that area, in a tumbling action. Such tumbling action is known to provide good combustion in reciprocating engines with spark ignition.

The engine according to a certain preferred embodiment of the invention operates in the following manner. During the intake stroke of the piston 1, an air/fuel mixture or other working gas is withdrawn from the intake valves 17' in open positions through the clearances between the disks of the intake valves 17' and the seats into the combustion chamber 23. The air/fuel mixture or working gas flows from the intake valves 17' and into the combustion chamber 23. The interaction of the dual flows may provide some beneficial tumbling action or mixing. At least a portion of the air/fuel mixture or working gas then flows over the cylinder wall and into the cylinder when the piston is on an intake stroke. Throat restrictions between the intake valves 17' and the cylinder 2 are not present as in the conventional two-valve side valve arrangement due to the proximity of the intake valves 17' to the cylinder 2 and the shape of the combustion chamber 23. The intake valves are closed upon inducting a sufficient amount of the air/fuel mixture or working gas. Combustion is induced by the igniter or spark plug upon appropriate compression of the air/fuel mixture or working gas. The working gas may be air or another mixture in the case of fuel injection which supplies suitable fuel during engine operation before ignition.

After or near the end of a power stroke, the exhaust valve is opened to convey the exhaust gases from the engine. The exhaust gases after combustion are within the cylinder and combustion chamber. The exhaust stroke flows the exhaust gases or a portion of the exhaust gases out of the cylinder and to the open exhaust valve. These exhaust gases pass over the cylinder wall between the cylinder bore and the exhaust valve and into the exhaust port past the exhaust valve. These exhaust gases pass over areas of the intake valves and may be provided with a cooling effect from the metal bridge area between the intake valves. The flow of the exhaust gases is not substantially restricted or shrouded by the geometry around the exhaust valve but is provided with a nozzle effect whereby the combustion chamber 23 decreases in cross-sectional area to the exhaust valve 15' without a diffusing throat constriction.

Figure 3:
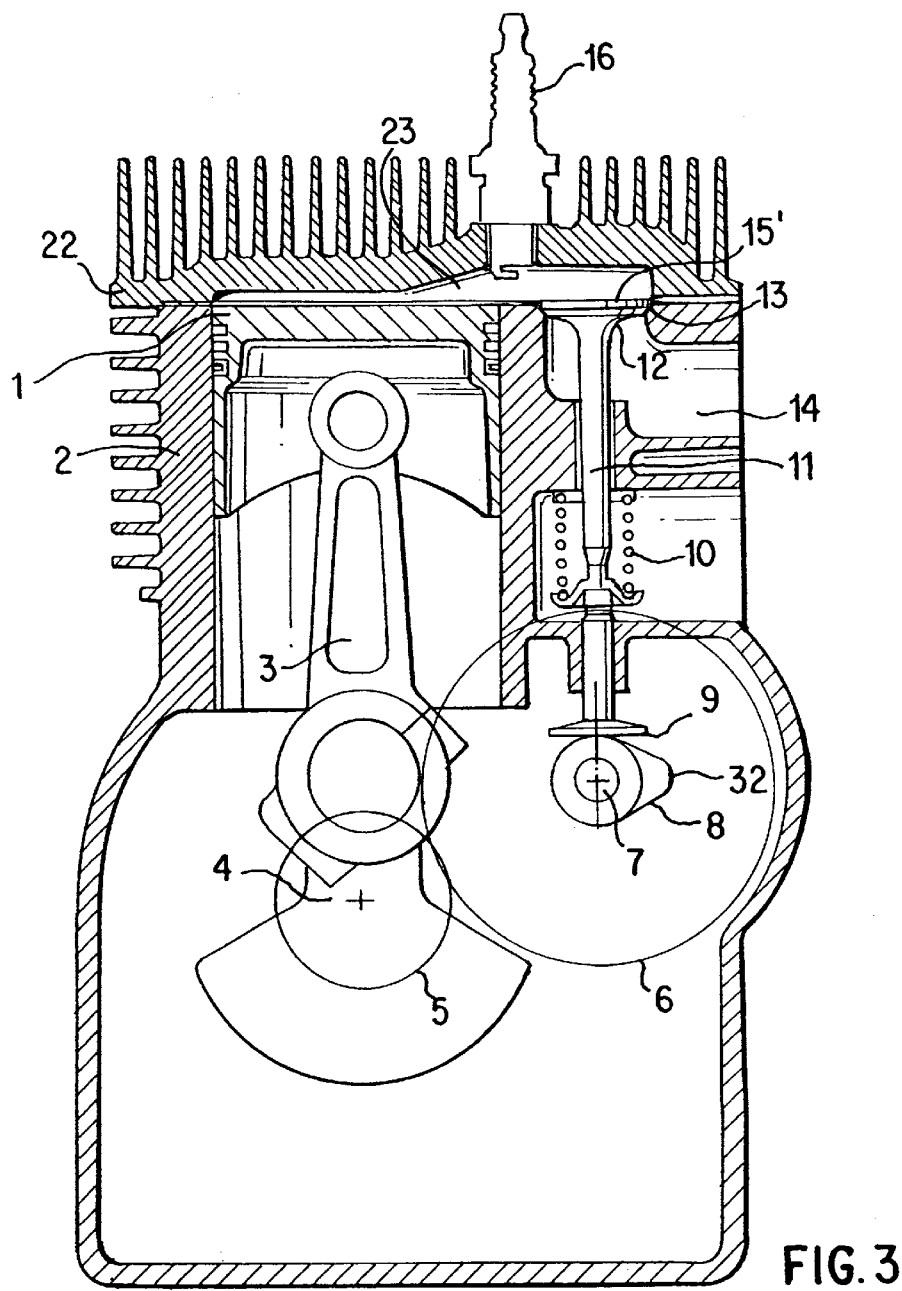
FIG. 3 shows an embodiment of the invention with a three-valve arrangement in section view.
Figure 6:
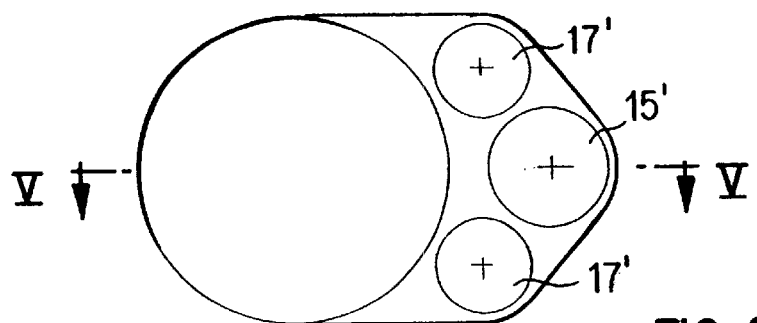
FIG. 6 shows a reference plan view for FIG. 5.
Figure 5:
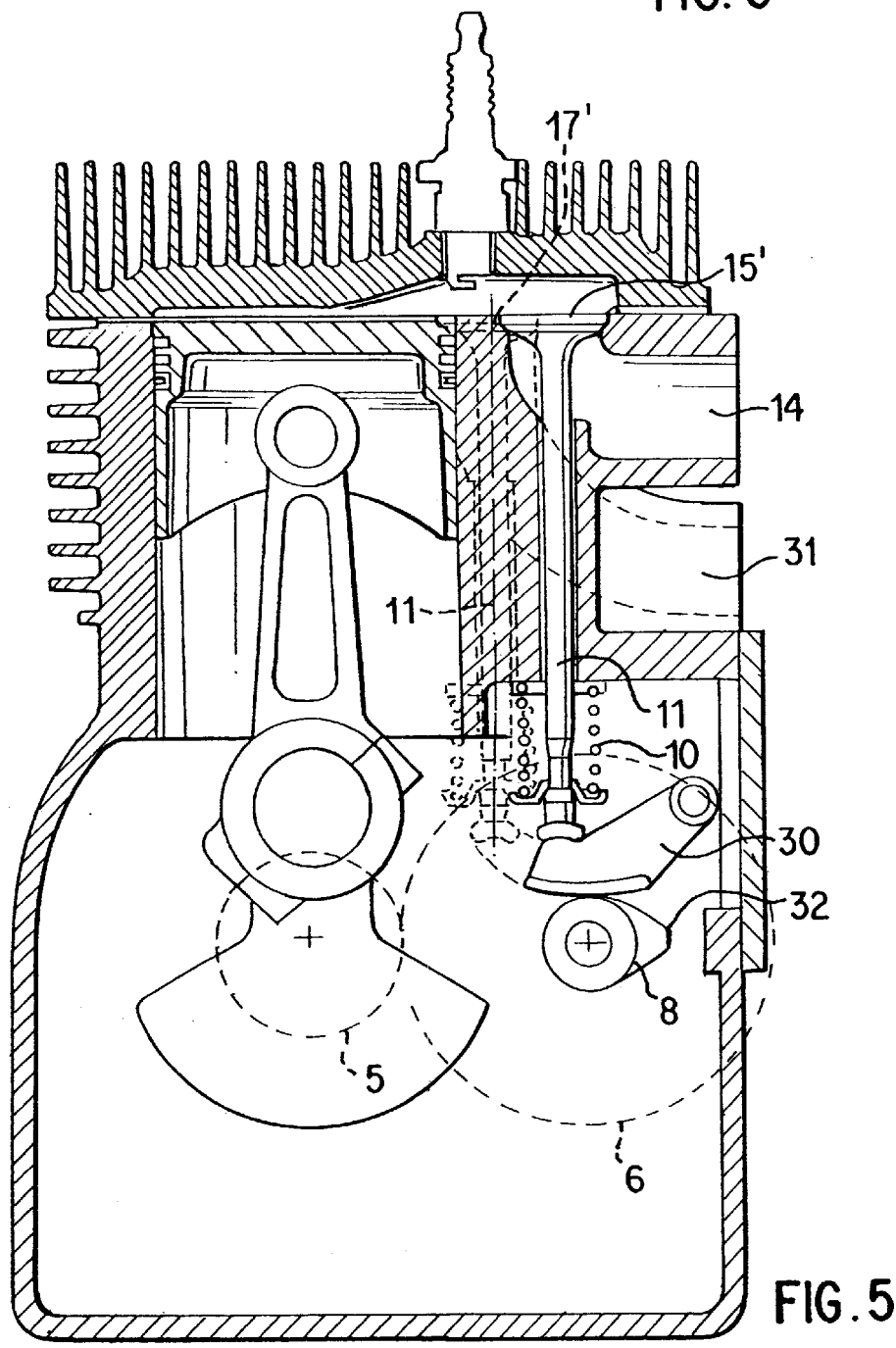
FIG. 5 shows an embodiment with a rocker arm for the valves in sectional side view.
Figure 8:
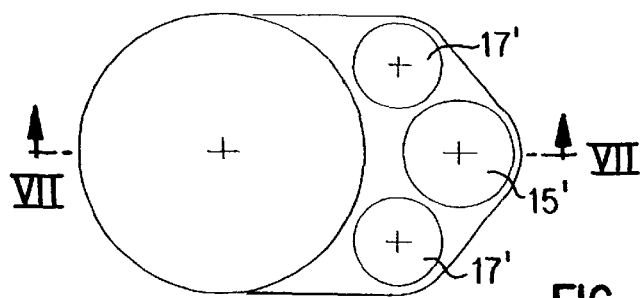
FIG. 8 shows a reference plan view of FIG. 7.

FIG. 3 shows a sectional view through the centerline 25 and exhaust valve 15'. Due to the distance of the exhaust valve 15' from the piston cylinder 2, the valve stem 11 of the exhaust valve 15' may be vertical or parallel to the piston cylinder 2 axis. The intake valves' valve stems 11 may be either tilted towards the top of the cylinder or parallel and operated with a rocker mechanism 30, 30'. The location of the spark plug/igniter 16 is above the sidewall of the piston cylinder 2, but may be located in another area. The combustion chamber 23 is shown defined by the cylinder head and engine block. The intake valves 17' are shown connected to each valve stem 11 lifted by rocker mechanism 30' connected to cam 8 and camshaft 7. The gear 6 operates the same way as with parallel valve stems. The intake valves 17' may be inclined from the camshaft 7 towards the piston cylinder 2 to provide clearance. An alternate embodiment may provide a rocker 30, 30'.

Figure 7:
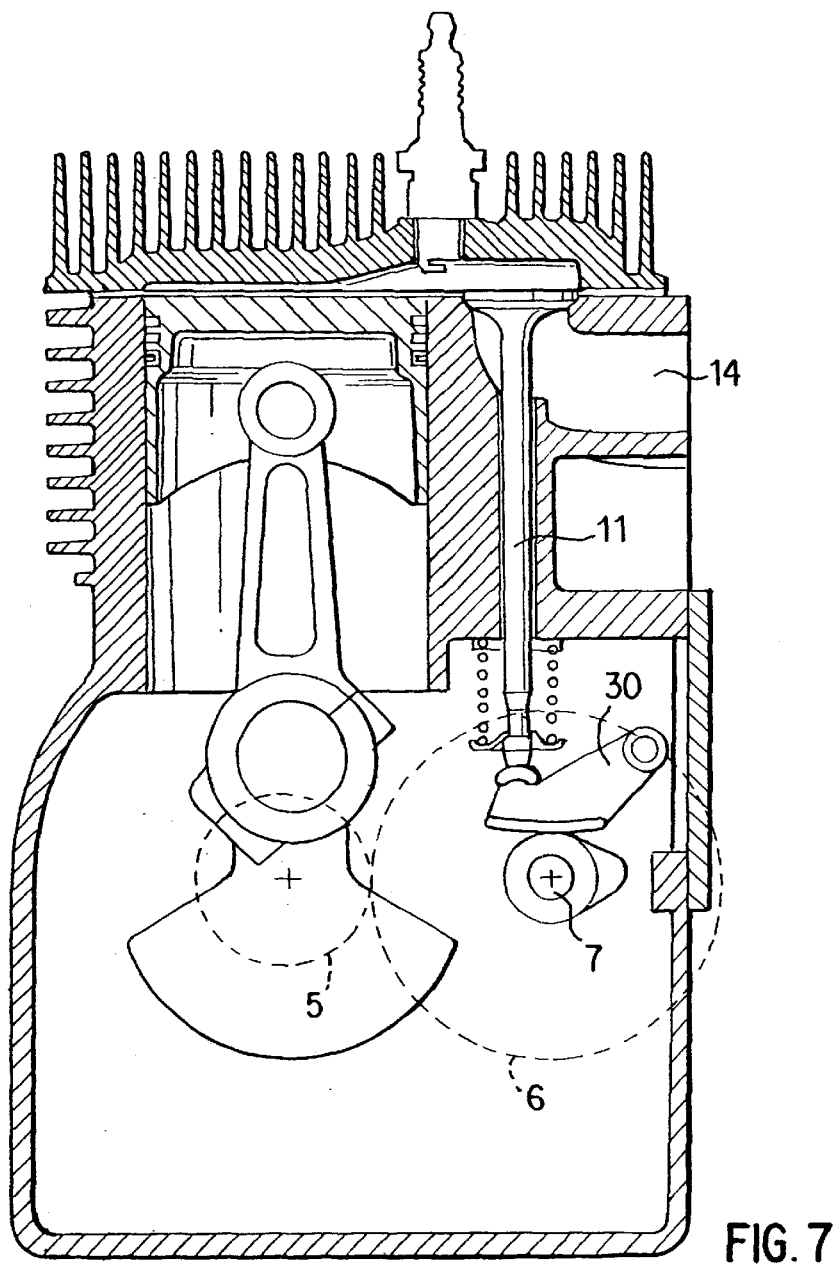
FIG. 7 shows a sectional view of the lifting mechanism for the exhaust valve.
Figure 7A:
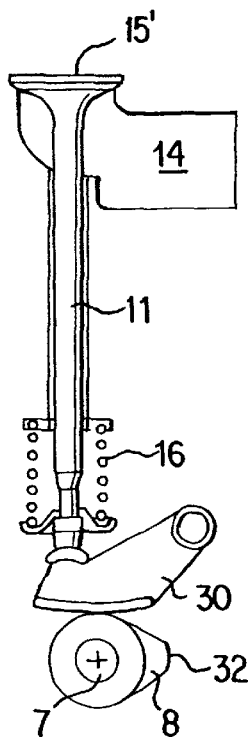
FIG. 7a shows a detail side view of the mechanism of FIG. 7.
Figure 10:
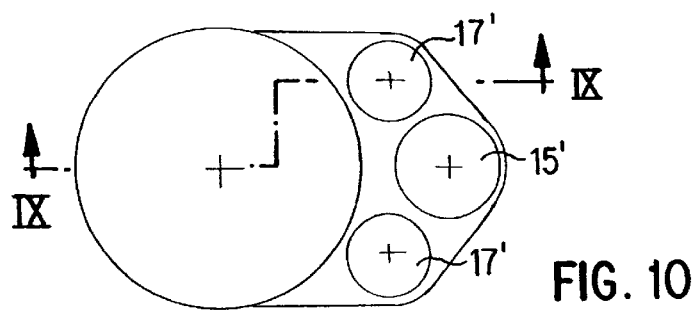
FIG. 10 shows a reference plan view of FIG. 9.
Figure 9:
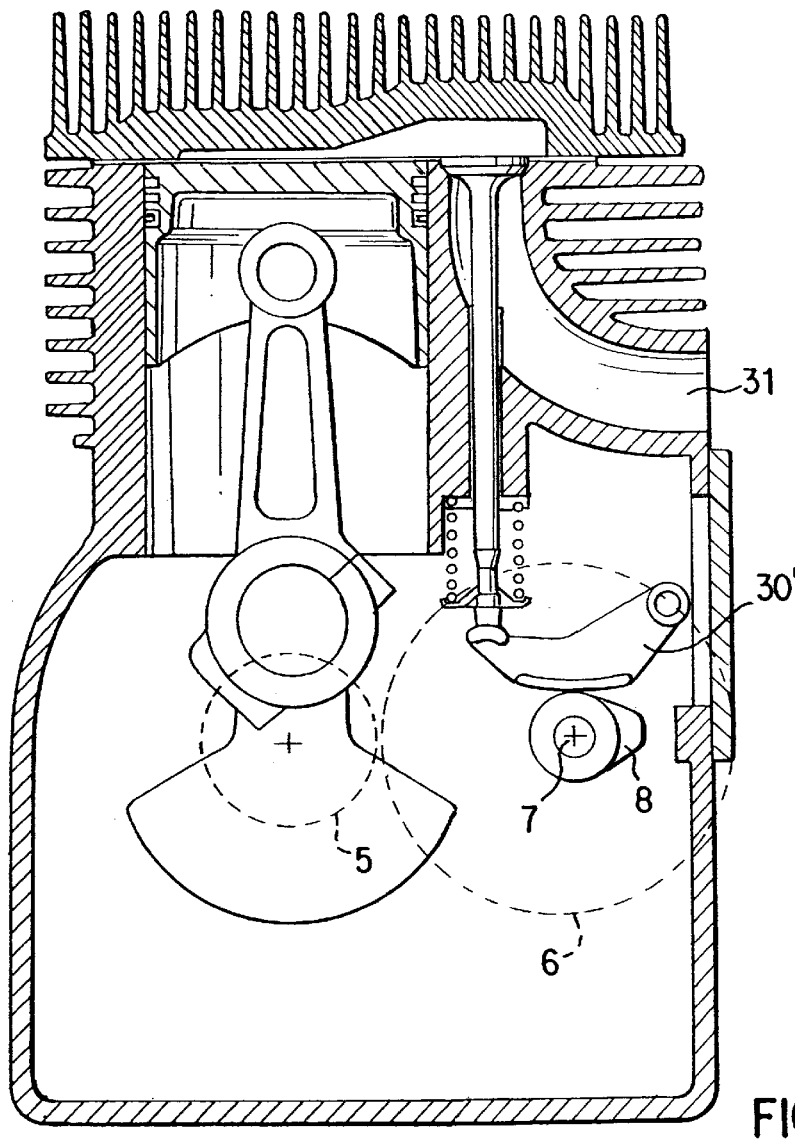
FIG. 9 shows a sectional side view of the lifting mechanism for the intake valve.
Figure 9A:
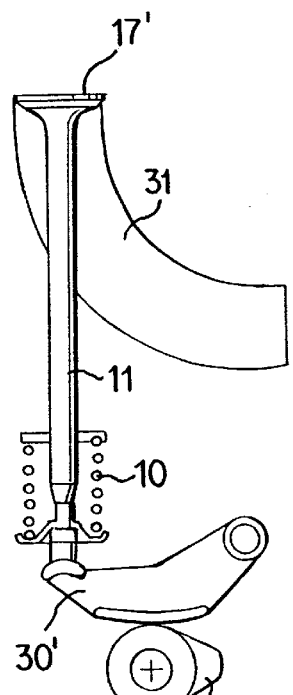
FIG. 9a shows a detail side view of the mechanism of FIG. 9.

FIGS. 5–10 show a preferred embodiment with the use of a rocker mechanism 30, 30' to control the valve lift from the camshaft 7. Intake port 31 and exhaust port 14 are shown in relation to the side view. FIGS. 7 and 7a show the detail of the rocker mechanism 30 with respect to the exhaust valve 15'. The exhaust valve 15' and stem 11 can be parallel to the piston cylinder 2, and the use of the rocker mechanism 30' also allows the intake valves 17' and respective valves stem 11 to also be parallel to the piston cylinder 2. FIGS. 11–14 show two possible port arrangements when there are two intake valves. FIGS. 11 and 12 show a "Siamese" intake port 31 where the intake ports merge into a single channel. FIGS. 13 and 14 show a typical port arrangement for two intake ports 31.

In a certain preferred embodiment, the exhaust valve is machined vertically as in FIG. 4, but the intake valves are machined at an angle to the vertical, as in FIG. 2, so that all valves are indexed off the same camshaft without the need for rocker arms to actuate them. The above arrangement may be reversed. The intake valves may be machined vertically and the exhaust valves machined at an angle, so as to accomplish the need to eliminate rocker arm actuation of the valves.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A side valve engine comprising, at least one combustion cylinder accommodating a piston driving a crankshaft, and a cylinder head, wherein each said combustion cylinder has two intake valves communicating with respective intake ports and an exhaust valve communicating with an exhaust port, said exhaust valve being located further away from the combustion cylinder than either of said intake valves.

2. The side valve engine according to claim 1, wherein the intake valves are located on both sides of a centerline radially through the combustion cylinder and substantially equidistant from said combustion cylinder, and wherein said exhaust valve is located on the centerline.

3. A method of making a side valve engine with a combustion cylinder, crankshaft and cylinder head, comprising;
   providing the combustion cylinder having two intake valves and an exhaust valve arranged to one radial side of the combustion cylinder, and
   securing a cylinder head with an igniter to the combustion cylinder.

4. A side valve engine comprising,
   at least one cylinder having a movable piston, and
   at least two intake valves being located to one side of each of the at least one cylinder.

5. The side valve engine according to claim 4, wherein at least one exhaust valve is located to the one side of said each of the at least one cylinder.

6. The side valve engine according to claim 5, wherein the intake valves are located between the cylinder and the exhaust valve.

7. The side valve engine according to claim 5, wherein the exhaust valve is located farther from the cylinder than the intake valves.

8. The side valve engine according to claim 5, wherein the intake valves are arranged on respective sides of a radial line of the cylinder to the exhaust valve.

9. The side valve engine according to claim 5, wherein the intake valves are symmetrically arranged on the one side of the cylinder between the exhaust valve and the cylinder.

10. An internal combustion engine, comprising;
    an engine block,
    a cylinder being located in the engine block and having at least one piston moveable therein,
    a cylinder head being mounted on the engine block and defining a combustion chamber,
    at least two intake ports being arranged in the engine block to one side of the cylinder, and
    intake valves being arranged to operatively open a respective intake port into the combustion chamber,
    wherein the engine block has a surface arranged at the one side of the cylinder, and
    wherein the intake valves and an exhaust valve are arranged on the surface of the engine block.

11. The side valve according to claim 10, wherein the intake valves and exhaust valve are operated via one camshaft.

12. The side valve according to claim 10, wherein a camshaft is provided with at least one rocker arm to operate one of the intake valves and exhaust valve.

13. The side valve according to claim 10, wherein the intake ports merge into one passage a distance from the intake valves.

14. The side valve according to claim 10, wherein the intake valves can be lifted to a level of ⅓ of an inner seat diameter of the intake valves.

15. The side valve according to claim 10, wherein a spark plug is arranged in the cylinder head.

16. The side valve according to claim 10, wherein a cross-sectional area of the combustion chamber decreases along a path from a cylinder wall to the exhaust valve.

17. The side valve according to claim 10, wherein the combustion chamber has a nozzle shape from the cylinder to the exhaust valve.

18. The side valve according to claim 10, wherein the combustion chamber is designed with substantially flat lateral walls from the cylinder to an area of the exhaust valve and with a rounded wall portion connecting the lateral walls in said area of the exhaust valve.

19. An internal combustion engine, comprising;
    an engine block having at least one cylinder with a piston movable therein,
    a cylinder head mounted on the engine block and defining a combustion chamber for the at least one cylinder,
    at least two corresponding inlet ports operatively supplying an air/fuel mixture to the corresponding combustion chamber, and
    at least one respective exhaust port operatively conveying exhaust gases from the corresponding combustion chamber,
    wherein the inlet ports and the exhaust port are arranged laterally to the at least one cylinder.

20. The internal combustion engine according to claim 19, wherein the inlet ports and the exhaust port are arranged laterally to one side of the cylinder.

21. The internal combustion engine according to claim 19, wherein the inlet ports and the exhaust port are arranged in the engine block.

22. A side valve internal combustion engine, comprising;
    a cylinder having a movable piston,
    at one end of the cylinder a cylinder head being arranged to form a combustion chamber,
    the cylinder having a radial cross-section at said one end,
    at least two inlet ports operatively supplying working fluid to the combustion chamber via respective inlet valves, and
    at least one exhaust port operatively conveying exhaust gas from the combustion chamber via an exhaust valve,
    wherein respective ends of the at least two inlet ports at the respective inlet valves are arranged laterally to the radial cross-section of the cylinder.

23. The side valve according to claim 22, wherein the inlet valves are arranged substantially parallel to the radial cross-section of the cylinder.

24. The side valve according to claim 22, wherein the inlet ports are arranged laterally at one radial side of the cylinder.

25. The side valve according to claim 24, wherein the exhaust port is arranged laterally at the one radial side of the cylinder.

26. The side valve according to claim 22, wherein the exhaust valve is arranged radially farther from the cylinder than the inlet valves.

27. The side valve according to claim 22, wherein the working fluid is an air/fuel mixture.

28. The side valve according to claim 22, wherein the inlet valves and the exhaust valve are operatively connected to one camshaft.

29. The side valve according to claim 22, wherein the inlet ports form a single inlet pipe upstream of the inlet valves.

30. The side valve according to claim 22, wherein the exhaust valve is located to alleviate heat distortion of the cylinder.

31. The side valve according to claim 22, wherein the inlet valves are located at respective sides of a line between an axial centerline of the cylinder and the exhaust valve.

32. The side valve according to claim 22, wherein a cross-sectional area of the exhaust port is substantially equal to a sum of cross-sectional areas of the inlet ports.

33. The side valve according to claim 22, wherein the combustion chamber forms a valve chest having a triangular shaped portion over the exhaust valve.

34. The side valve according to claim 33, wherein the triangular shaped portion has a rounded corner.

35. The side valve according to claim 22, wherein the combustion chamber forms a valve chest with a first side adjacent the exhaust valve and a first of the at least two inlet valve and a second side adjacent the exhaust valve and a second of the at least two inlet valves.

36. The side valve according to claim 35, wherein an angle between the first side and second side is at least 90°.

37. A method of operating an engine having at least one cylinder with a movable piston, comprising;

supplying an air/fuel mixture from at least two intake valves into a combustion chamber associated with the at least one cylinder, combusting said air/fuel mixture, and conveying exhaust gases through an exhaust valve, wherein the intake valves and exhaust valve are arranged at a lateral side of the cylinder.

38. A method according to claim 37, wherein the engine is a side valve engine.

39. A method according to claim 37, wherein the exhaust valve is arranged farther from the cylinder than either of the intake valves.

40. A method according to claim 37, wherein at least a valve stem of one of the intake valves or exhaust valve is substantially parallel to the cylinder.

41. A method according to claim 37, wherein the combustion chamber has two lateral walls which converge in an area of the exhaust valve.

* * * * *